(12) United States Patent
Inadama et al.

(10) Patent No.: US 8,933,410 B2
(45) Date of Patent: Jan. 13, 2015

(54) THREE-DIMENSIONAL POSITION-SENSITIVE RADIATION DETECTOR AND METHOD OF IDENTIFYING RADIATION DETECTED POSITIONS THEREIN

(75) Inventors: Naoko Inadama, Chiba (JP); Hideo Murayama, Chiba (JP); Taiga Yamaya, Chiba (JP); Mitsuo Watanabe, Hamamatsu (JP); Takahiro Moriya, Hamamatsu (JP); Kenshi Fukumitsu, Hamamatsu (JP); Tomohide Omura, Hamamatsu (JP)

(73) Assignees: National Institute of Radiological Sciences, Chiba-Shi (JP); Hamamatsu Photonics K.K., Hamamatsu-Shi (JP)

( * ) Notice: Subject to any disclaimer, the term of this patent is extended or adjusted under 35 U.S.C. 154(b) by 180 days.

(21) Appl. No.: 13/636,936

(22) PCT Filed: Mar. 29, 2010

(86) PCT No.: PCT/JP2010/055588
§ 371 (c)(1),
(2), (4) Date: Oct. 31, 2012

(87) PCT Pub. No.: WO2011/121707
PCT Pub. Date: Oct. 6, 2011

(65) Prior Publication Data
US 2013/0056638 A1  Mar. 7, 2013

(51) Int. Cl.
*G01T 1/20* (2006.01)
*G01T 1/164* (2006.01)

(52) U.S. Cl.
CPC .................................. *G01T 1/1644* (2013.01)
USPC ......................................................... 250/368

(58) Field of Classification Search
CPC .... G01T 1/2002; G01T 1/2006; G01T 1/2018
USPC ......................................................... 250/368
See application file for complete search history.

(56) References Cited

U.S. PATENT DOCUMENTS

| 2005/0253073 | A1 | 11/2005 | Joram et al. | |
|---|---|---|---|---|
| 2010/0176301 | A1* | 7/2010 | Wieczorek et al. | 250/363.02 |
| 2011/0121192 | A1* | 5/2011 | Moriya et al. | 250/370.11 |

FOREIGN PATENT DOCUMENTS

| JP | A-2005-533245 | 11/2005 |
|---|---|---|
| JP | A-2009-506316 | 2/2009 |

(Continued)

OTHER PUBLICATIONS

Oct. 23, 2012 International Preliminary Report on Patentability issued in International Patent Application No. PCT/JP2010/055588.

(Continued)

*Primary Examiner* — David Porta
*Assistant Examiner* — Edwin Gunberg
(74) *Attorney, Agent, or Firm* — Oliff PLC

(57) ABSTRACT

A three-dimensional position-sensitive radiation detector is provided which has a three-dimensional array of photodetectors disposed on the surface of a scintillator block and which is capable of three-dimensionally identifying the position of light emission at which radiation has been detected within the detector. The three-dimensional position-sensitive radiation detector includes: a scintillator block including a central portion which restricts the direction of diffusion of light so as to direct the light in three axial directions and which has an optically discontinuous region, and an outer portion which is disposed on the outside of the central portion and which does not restrict the direction of diffusion of light; and photodetectors disposed on at least two outer circumferential surfaces of the scintillator block. The detector identifies three-dimensionally the position of light emission, thereby preventing deterioration in position discrimination performance even when inner scintillator elements are smaller than the photodetectors.

14 Claims, 13 Drawing Sheets

(56) References Cited

FOREIGN PATENT DOCUMENTS

| JP | A-2009-121929 | 6/2009 |
| JP | A-2009-270971 | 11/2009 |

OTHER PUBLICATIONS

Huber et al., "An LSO Scintillator Array for a PET Detector Module with Depth of Interaction Measurement," IEEE Transactions on Nuclear Science, 2001, vol. 48, No. 3, pp. 684-688.

Shao et al., "Design Studies of a High Resolution PET Detector Using APD Arrays," IEEE Transactions on Nuclear Science, 2000, vol. 47, No. 3, pp. 1051-1057.

Levin, "Design of a High-Resolution and High-Sensitivity Scintillation Crystal Array for PET With Nearly Complete Light Collection," IEEE Transactions on Nuclear Science, 2002, vol. 49, No. 5, pp. 2236-2243.

Yazaki et al., "Preliminary Study on a New DOI PET Detector with Limited Number of Photo-Detectors," The 5$^{th}$ Korea-Japan Joint Meeting on Medical Physics, Sep. 2008.

Leblanc et al., "A Novel PET Detector Block with Three Dimensional Hit Position Encoding," IEEE Nuclear Science Symposium Conference Record, 2003.

Laan et al., "Using Cramer-Rao Theory Combined with Monte Carlo Simulations for the Optimization of Monolithic Scintillator PET Detectors," IEEE Transactions on Nuclear Science, 2006, vol. 53, No. 3, pp. 1063-1070.

Bruyndonckx et al., "Performance Study of a PET Detector Module Based on a Continuous Scintillator," IEEE Transactions on Nuclear Science, 2006, vol. 53, No. 5, pp. 2536-2542.

Fremout et al., "Spatial Resolution and Depth-of-Interaction Studies with a PET Detector Module Composed of LSO and an APD Array," IEEE Transactions on Nuclear Science, 2002, vol. 49, No. 1, pp. 131-138.

Carles et al., "Energy and Spatial Resolution for a Continuous Scintillation Crystal—Interface—Continuous Scintillation Crystal System in Positron Emission Tomography (PET)," IEEE Nuclear Science Symposium Conference Record, 2009, pp. 1-4.

Jun. 29, 2010 International Search Report issued in International Patent Application No. PCT/JP2010/055588.

* cited by examiner (a)

(b)

(a)

(b)

THREE-DIMENSIONAL POSITION-SENSITIVE RADIATION DETECTOR AND METHOD OF IDENTIFYING RADIATION DETECTED POSITIONS THEREIN

TECHNICAL FIELD

The present invention relates to three-dimensional position-sensitive radiation detectors and methods of identifying radiation detected positions therein. More particularly, the invention relates to a three-dimensional position-sensitive radiation detector and a method of identifying radiation detected positions therein, in which the three-dimensional position-sensitive radiation detector has photodetectors disposed on the surface of a cubic or rectangular parallelepiped scintillator block in three dimensions, which emits light when absorbing radiation, and is preferred for use as the detector capable of three-dimensionally identifying the position of light emission at which the radiation was detected within the detector, the three-dimensional position-sensitive radiation detector being capable of preventing deterioration in position discrimination performance even when the inner scintillator elements are smaller than the light-receiving elements.

BACKGROUND ART

Employed as the photodetector for PET detectors have been photomultiplier tubes (PMT). When incorporated into the PET device so as to be located on a surface facing to a subject (to be referred to as the top surface of the scintillator block), the PMT not only causes the occupied space thereof to invade the detection region but also serves as a scattering body during detection of radiation. On the other hand, coupling the PMT to a side surface of the scintillator block causes an increase in the region in which radiation cannot be detected, resulting in the PET device having a reduced sensitivity. Thus, as shown in FIG. 1(a), the PMT 12 was coupled only to the surface opposite to the subject (to be referred to as the bottom surface of the scintillator block 10). The two-dimensional position of a place at which radiation was absorbed in the scintillator block 10 is identified by coupling a plurality of PMTs or the position sensitive PMT (PS-PMT) 12 to the bottom surface and then performing the Anger-type calculation on signals therefrom, that is, performing a position calculation in the same manner as is performed to determine the center of gravity. Responses associated with the positions of absorption appear on the two-dimensional (2D) position histogram that represents the results of the Anger-type calculation. When a block of an array of small scintillator elements is employed in place of one large scintillator, the responses from each element appear discontinuously as illustrated in FIG. 1(b).

Under the condition that the PMT is coupled only to the bottom surface of the scintillator block, the scintillator block was improved in various ways so as to obtain a position in the direction of depth (DOI information) with respect to the photodetector. However, recently, semiconductor photodetectors such as avalanche photodiodes (APD) or Geiger mode APDs (also referred to as Si-PM or MPPC (Multi-Pixel Photon Counter) as a product name) have been rapidly developed, so that studies have been made on PET detectors with the PS-PMT replaced by the semiconductor photodetector. The semiconductor photodetector, which is small and thin, enables new detector designs, for example, such that a semiconductor photodetector having a reduced volume does not function as a scattering body even when the photodetector is disposed on the top surface of the detector. This fact has been utilized for studies on a DOI detection method (see Non-Patent Literatures 1 and 2) as shown in FIGS. 2(a) and (b), in which photodetectors are coupled to the top and bottom surfaces of an element array of the scintillator block 10 (a photodiode (PD) 14 on the top surface and the PS-PMT 12 on the bottom surface in FIG. 2(a), and a position sensitive APD 16 on both the top and bottom surfaces in FIG. 2(b)), so as to obtain DOI information by the ratio of signal pulse heights from the photodetectors on the top and bottom surfaces. The aforementioned fact has also been utilized for studies on a DOI detector in which the photodetector (APD 16) is coupled to a side surface as shown in FIG. 2(c) so as to identify the position in the DOI direction from the signal therefrom (see Non-Patent Literature 3). In the technique of FIG. 2(c) in which the photodetector is connected to a side surface, the detected position in the APD 16 is the DOI information itself, whereas the packing fraction is decreased in the PET device by the volume of the photodetectors though scintillation light can be more efficiently obtained with reduced loss of light because a wider surface of the scintillator elements is coupled to the photodetectors.

Furthermore, as shown in FIG. 2(d), the inventors have studied on the DOI detector in which semiconductor photodetectors 18 are disposed on the surface of the three-dimensional array 10A of small scintillator elements 10C in three dimensions (see Patent Literature 1 and Non-Patent Literature 4). In this structure, letting the three directions along the sides of the scintillator block be x, y, and z, photodetectors are disposed on each of the xy plane, the xz plane, and the yz plane, so that photodetector signals are operated to determine the x component, the y component, and the z component at a radiation absorption position. Other groups have suggested a detector structure in which the block is made up of one large scintillator having no optical discontinuity and photodetectors are disposed on each of the xy plane, the xz plane, and the yz plane. In one structure, a photodetector which is not of a position sensitive type is used to devise a method for identifying a radiation absorption position by simulation (see Non-Patent Literature 5), while another structure was used as an example of arrangements of photodetectors when a detector performance comparison was made by simulation between different arrangements of photodetectors (see Non-Patent Literature 6).

CITATION LIST

Patent Literature

Patent Literature 1: Japanese Patent Application Laid-Open No. 2009-121929
Patent Literature 2: Japanese Patent Application Laid-Open No. 2009-270971

Non-Patent Literature

Non-Patent Literature 1: J. S. Huber, W. W. Moses, M. S. Andreaco, and O. Petterson, "An LSO scintillator array for a PET detector module with depth of interaction measurement," IEEE Trans. Nucl. Sci., Vol. 48, No. 3, pp. 684-688, June 2001.
Non-Patent Literature 2: Y. Shao, R. W. Silverman, R. Farrell, L. Cirignano, R. Grazioso, K. S. Shah, G. Visser, M. Clajus, T. O. Turner, and S. R. Cherry, "Design studies of a high resolution PET detector using APD array," IEEE Trans. Nucl. Sci., Vol. 47, No. 3, pp. 1051-1057, June 2000.

Non-Patent Literature 3: C. S. Levin, "Design of a high-resolution and high-sensitivity scintillation crystal array for PET with nearly complete light collection," IEEE Trans. Nucl. Sci., Vol. 49, No. 5, pp. 2236-2243, October 2002.

Non-Patent Literature 4: Y. Yazaki, H. Murayama, N. Inadama, A. Ohmura, H. Osada, F. Nishikido, K. Shibuya, T. Yamaya, E. Yoshida, T. Moriya, T. Yamashita, H. Kawai, "Preliminary study on a new DOI PET detector with limited number of photo-detectors," The 5th Korea-Japan Joint Meeting on Medical Physics, Sep. 10-12, 2008, Jeju, Korea, YI-R2-3, 2008.

Non-Patent Literature 5: J. W. LeBlanc and R. A. Thompson, "A novel PET detector block with three dimensional hit position encoding" IEEE Nuclear Science Symposium Conference Record, J1-2, Portland, Oreg., 2003.

Non-Patent Literature 6: D. J. van der Laan, M. C. Maas, D. R. Schaart, P. Bruyndonckx, S. Leonard, and C. W. E. van Eijk, "Using Cramer-Rao theory combined with Monte Carlo simulations for the optimization of monolithic scintillator PET detectors" IEEE Trans. Nucl. Sci., Vol. 53, No. 3, pp. 1063-1070, June 2006.

Non-Patent Literature 7: P. Bruyndonckx, S. Leonard, C. Lemaitre, S. Tavernier, Y. Wu, and Crystal Clear Collaboration, "Performance study of a PET detector module based on a continuous scintillator," IEEE Trans. Nucl. Sci., Vol. 53, No. 5, pp. 2536-2542, October 2006.

Non-Patent Literature 8: A. A. R. Fremout, R. Chen, P. Bruyndonckx, and S. P. K. Tavernier, "Spatial Resolution and Depth-of-Interaction Studies With a PET Detector Module Composed of LSO and APD Array," IEEE Trans. on Nucl. Sci., vol. 49, No. 1, pp. 131-138, February 2002.

Non-Patent Literature 9: M. Caries, A. Ros-Garc'ia, Ch. W. Lerchey, F. S'anchez, A. Sebasti'ay, J. M. Benlloch, "Energy and spatial resolution for a continuous scintillation crystal—interface—continuous scintillation crystal system in Positron Emission Tomography (PET)" IEEE Nuclear Science Symposium Conference Record, M9-149, Florida, Orland, 2009.

SUMMARY OF INVENTION

The scintillator block 10 having photodetectors disposed thereon may be made up of the three-dimensional array 10A of small scintillator elements 10C. In this case, as shown in FIG. 3(a), the scintillation light which is emitted by an element 10C when having absorbed radiation tends to propagate along the arrays (the arrays before and after, on the right and left of, and above and below the element), which include the emitting element, due to optical discontinuity between the scintillator element and the inter-element substance.

On the other hand, as shown in FIG. 3(b), when the scintillator block 10 is made up of one large cubic scintillator 10B having no optical discontinuity, light is radially spread without being restricted within the block.

As shown in FIG. 3(a), the light which is spread in the scintillator block 10 made up of a three-dimensional element array is characterized by being unevenly distributed to propagate along the element arrays above and below, on the right and left of, and before and after the emitting scintillator element. The PS-PMT, which has been conventionally employed as a photodetector, has a common window glass as a light-receiving surface to allow light to spread therethrough, so that even the light incident between sampling points can be received. In contrast to this, the semiconductor photodetector has a dead zone between the photodetectors. Accordingly, even when part of the ends of each scintillator element array is coupled to some semiconductor photodetector and some scintillator element emits light, it is desirable to receive the light on the ends of the element array above and below, on the right and left of, and before and after that scintillator element. However, when the number of semiconductor photodetectors is to be reduced, there may be an array of scintillator elements which is not optically coupled to the semiconductor photodetector at the ends of the element array, causing deterioration in the accuracy of discriminating the position on the array.

Likewise, when the photodetector is greater than the scintillator element so that one photodetector covers all the end faces of a plurality of element arrays, poor spreading of light causes signals not to reach the mutually different photodetectors nearest those element arrays. It is thus difficult to differentiate between those element arrays by the calculation of signal positions.

As for the aforementioned two problems, it is typically possible to interpose a light guide between the photodetector and the scintillator block to cause light to spread immediately before light is received, thereby enabling the identification of the emitting scintillator element array while minimizing deterioration of position information. The light guide may be formed of a resin such as acrylic or glass. However, as shown at a lower portion in FIG. 4, the light guide 20 itself absorbs almost no radiation, and even when the light guide 20 absorbs radiation, no light is emitted. In particular, the photodetectors (especially, thin semiconductor photodetectors) 18 may be coupled to a plurality of surfaces of the scintillator block 10. In this case, as shown at an upper right portion in FIG. 4, in the PET device 100, the size of the light guide 20 serves as the dead zone for radiation, causing degradation in the sensitivity of the device.

On the other hand, in the detector which includes the scintillator block 10 made up of one large scintillator 10B having no optical discontinuity, scintillation light is spread from the point of emission without being restricted as shown in FIG. 3(b). Accordingly, although there is no problem with a detector structure that can use the entire surface of the scintillator block 10 to receive light, the photodetector having a partially dead zone surface may be provided with a reflective material to cover the dead zone in order to prevent loss of light, thereby allowing the reflected light to proceed without being restricted. This may lead to loss of position information and deterioration in position accuracy. Covering the dead zone with a light absorptive material such as black paper in order to prevent the loss and deterioration leads to deterioration of position information due to loss of light. To enhance the efficiency of radiation detection, the scintillator block may be made thicker. This would increase the distance from the point of emission to the photodetector surface and excessively spread light, causing the light to be significantly affected by reflection on the side surfaces or absorption and thus further deterioration in position accuracy (see Non-Patent Literature 7). As an attempt to prevent deterioration in position resolution for a scintillator block having an increased thickness, there have been provided several improvements: the surface opposite a light-receiving surface of the scintillator block is made up of a plurality of triangular mountains (see Non-Patent Literature 8) and the scintillator block is divided into two layers (see Non-Patent Literature 9). In the studies described above, the conventional detector structure was taken into account and the light-receiving surface is one surface of the scintillator block.

The present invention was developed in view of the aforementioned circumstances. It is thus an object of the invention to provide a three-dimensional position-sensitive radiation detector and a method of identifying radiation detected positions therein, in which the detector can prevent deterioration in position discrimination performance even when an inner scintillator element is smaller than a photodetector.

In a three-dimensional position-sensitive radiation detector which has photodetectors disposed on a scintillator block surface in three dimensions and which is capable of three-dimensionally identifying the position of light emission at which radiation was detected within the detector, the scintillator elements 10C may be smaller than the photodetectors 18 as shown in FIG. 5(a). In this case, scintillation light from adjacent scintillator elements 10C are received on the photodetectors 18 generally in the similar distribution, in the case of which the calculation of the photodetector signals identifies with difficulty the element in which the light was detected. In this context, as shown in FIG. 5(b), disposed between the scintillator block 10 and the photodetectors 18 are scintillator plates 11 so as to spread scintillation light to neighboring photodetectors 18. Although the scintillator elements 10C were difficult to identify without the scintillator plates 11, this enables the scintillator elements 10C to distribute the scintillation light differently to the photodetectors 18. As a result, the elements can be identified by the results of signal position calculations.

On the other hand, as shown in FIG. 5(c), when radiation is absorbed in the scintillator plates 11, the light reaching the photodetectors 18 on the far surface (the top surface in FIG. 5(c)) passes through the scintillator element array to be thereby prevented from being spread, thus allowing for providing improved position discrimination accuracy.

This also holds true even for the case where the scintillator block is made up of a large single scintillator. Furthermore, the inner scintillator and the outer scintillator plate can be formed within the same scintillator block.

The present invention was developed on the basis of the aforementioned findings. The aforementioned problems are solved by a three-dimensional position-sensitive radiation detector which includes: a scintillator block having a central portion and an outer portion, the central portion restricting the direction of diffusion of light so as to guide the light in three axial directions and having an optically discontinuous region, the outer portion being disposed outside the central portion and not restricting the direction of diffusion of light; and photodetectors disposed on at least two outer circumferential surfaces of the scintillator block, wherein the three-dimensional position-sensitive radiation detector is characterized by three-dimensionally identifying the position of light emission.

Here, the outer portion and the photodetectors can be disposed on all the outer circumferential surfaces of the scintillator block.

Alternatively, the outer portion and the photodetectors can be disposed on some of the outer circumferential surfaces of the scintillator block.

Furthermore, the central portion can be provided with an array of a plurality of scintillator elements, and the outer portion is made up of scintillator plates.

Alternatively, the central portion can be provided with a block of scintillators having an optically discontinuous region formed therein, and the outer portion is made up of scintillator plates.

It is also possible to insert a reflective material in between the contact surfaces of the scintillator plates.

Furthermore, the scintillator plates can be prevented from being brought into contact with each other.

Furthermore, the central portion and the outer portion can be made up of a single scintillator.

Furthermore, the present invention provides a method for identifying a detected position in the aforementioned three-dimensional position-sensitive radiation detector which employs different types of scintillators for the central portion and the outer portion, the method including, in identifying a detected position in the three-dimensional position-sensitive radiation detector:

identifying, by pulse shape discrimination of photodetector signals, whether light has been received in the central portion or in the outer portion;

performing a position calculation for the central portion when the light has been received in the central portion; and performing a position calculation for the outer portion when the light has been received in the outer portion.

Furthermore, the present invention provides a method for identifying a detected position in the aforementioned three-dimensional position-sensitive radiation detector, the method including, in identifying a detected position in the three-dimensional position-sensitive radiation detector:

identifying, on the basis of different pulse height ratios of received-light signals outputted from each photodetector, whether light has been received in the central portion or in the outer portion;

performing a position calculation for the central portion when the light has been received in the central portion; and performing a position calculation for the outer portion when the light has been received in the outer portion.

In this manner, the scintillator block can be made up of a central portion and an outer portion, the central portion being a three-dimensional array 10A of small scintillator elements or a large single scintillator 10B having an optically discontinuous surface which is formed therein, e.g., by laser processing, the outer portion serving as a light guide, and the spread of light can be controlled, thereby providing an improved resolution for radiation detected positions.

Furthermore, the present invention does not require an increased packing fraction unlike the PET detector, and is also applicable to a radiation detector with a three-dimensional disposition of photodetectors other than semiconductor photodetectors, such as PS-PMTS.

DESCRIPTION OF EMBODIMENTS

Now, the embodiments of the present invention will be described in more detail below with reference to the drawings.

Figure 1:
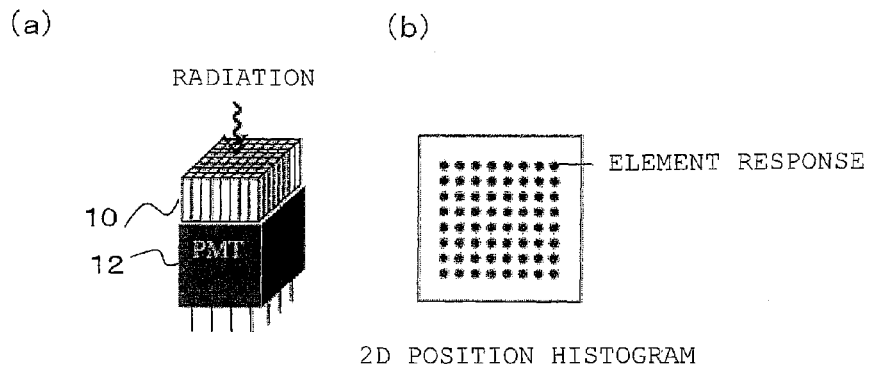
FIG. 1(a) is a perspective view illustrating an example of a conventional radiation detector and FIG. 1(b) is a view illustrating a two-dimensional (2D) position histogram provided by the same.
Figure 2:
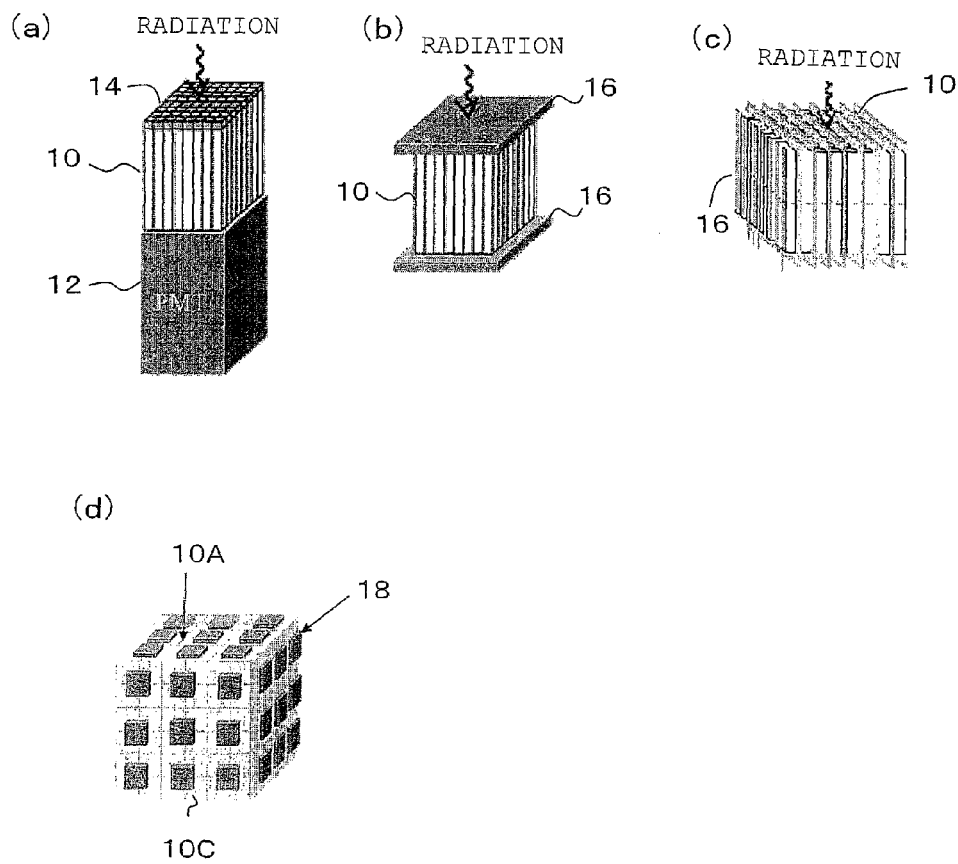
FIG. 2 shows perspective views of various examples of conventional DOI detectors.
Figure 3:
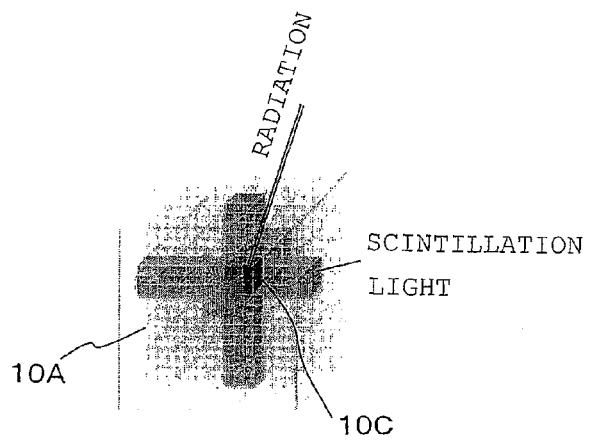
FIG. 3(a) is a perspective view illustrating how light propagates in a scintillator block which is made up of a three-dimensional array of small scintillator elements.
FIG. 3(b) is a view illustrating how light is spread in a scintillator block which is made up of a large single scintillator.
Figure 3:
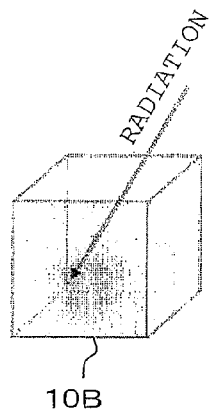
Figure 4:
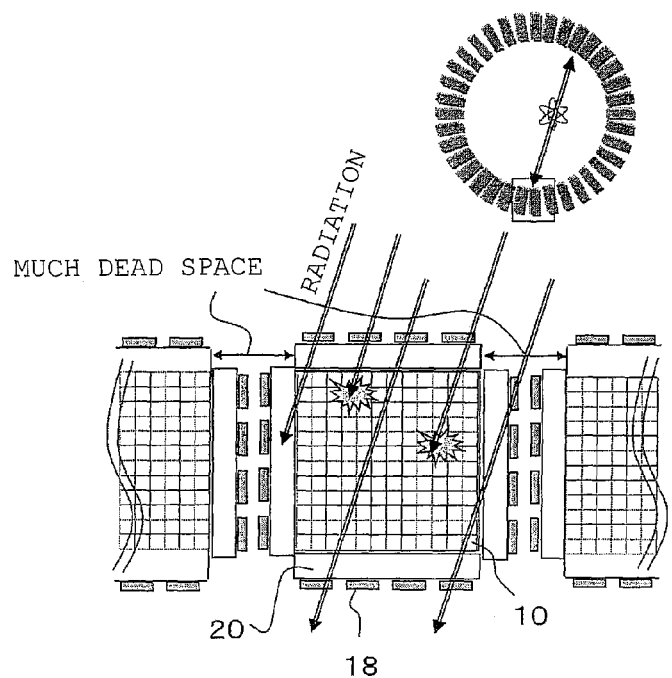
FIG. 4 is an explanatory cross-sectional view illustrating a conventional problem.
Figure 5:
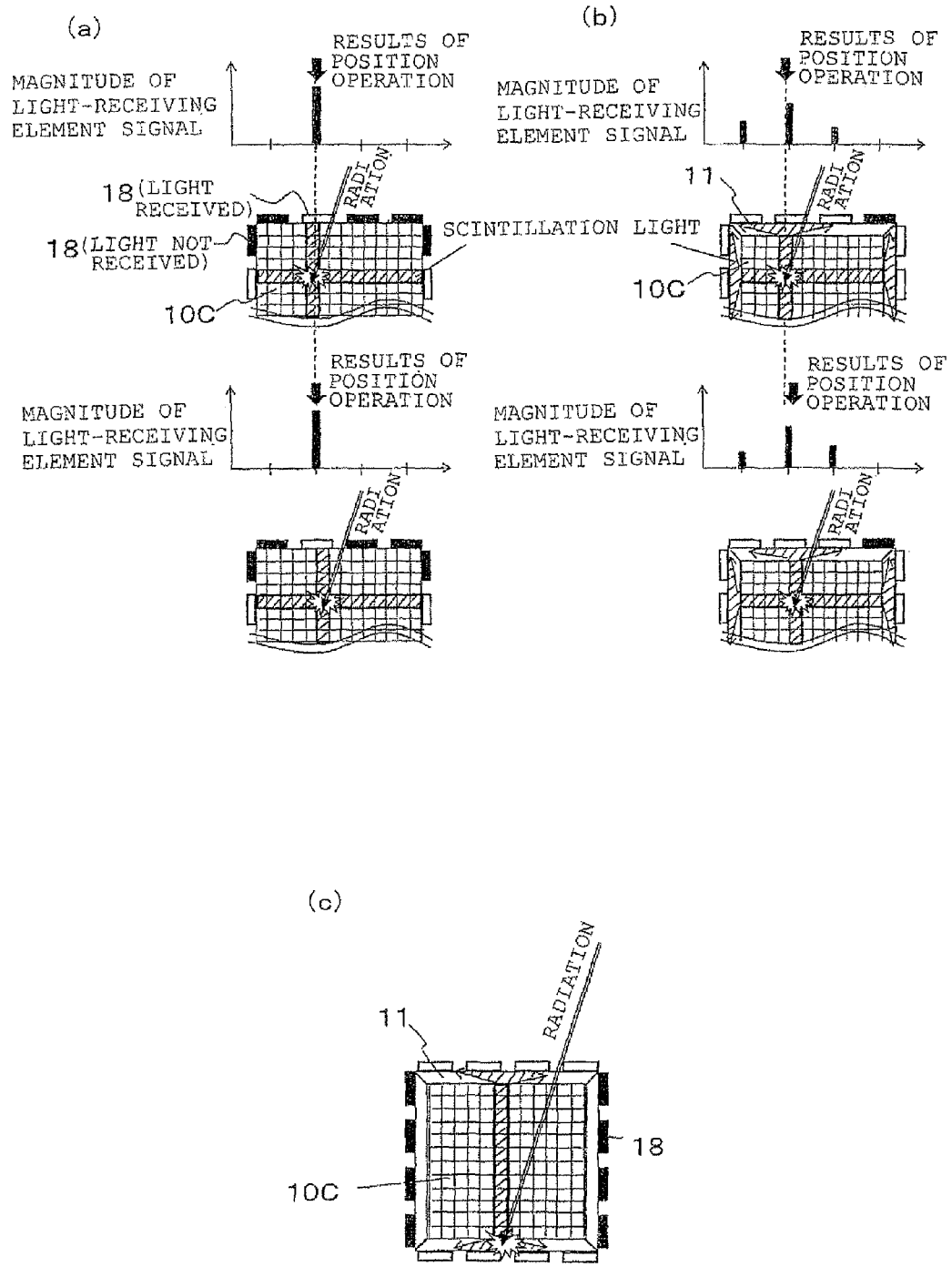
FIG. 5 shows the principle of the present invention.
Figure 6:
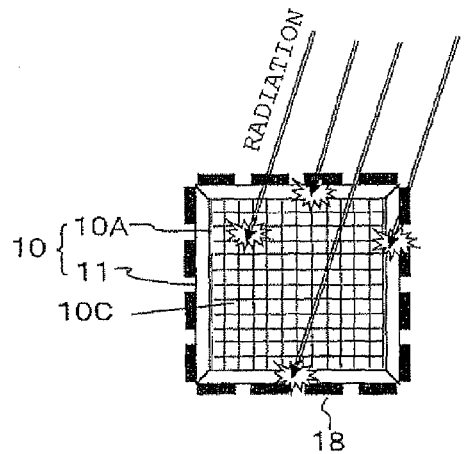
FIGS. 6(a) and 6(b) are a cross-sectional view and an exploded perspective view illustrating the configuration of a radiation detector according to a first embodiment of the present invention.
Figure 6:
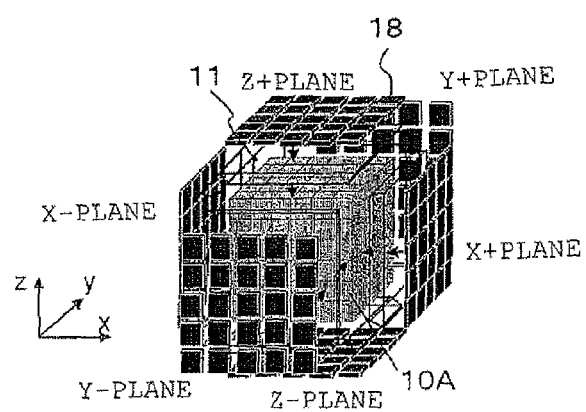

As shown in FIGS. 6(a) (a cross-sectional view) and 6 (b) (an exploded perspective view), a radiation detector according to a first embodiment of the present invention is configured such that a scintillator block 10 is made up of a central portion with a three-dimensional array 10A of small scintillator elements 100 and an outer portion with scintillator plates 11 which do not restrict the direction of light diffusion. Here, the inner scintillator elements 100 are smaller than photodetectors 18, so that a single photodetector 18 covers all the ends of a plurality of element arrays.

Figure 7:
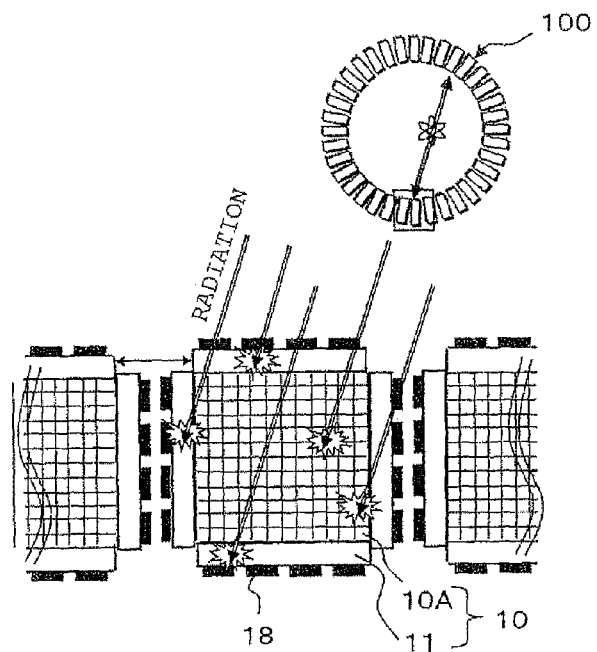
FIG. 7 is a cross-sectional view illustrating the first embodiment incorporated into a PET device.

In the present embodiment, the scintillator plates 11 serve just as the light-receiving glass or the light guide of a PS-PMT for light emitted from the scintillator elements 100 of the scintillator element array 10A. This allows the scintillator plates 11 to spread light, thereby preventing significant deterioration in position identification performance even when the element array including the scintillator element 100 emitting the light is located in between the semiconductor photodetectors 18 or a plurality of element arrays are located on the same photodetector. Furthermore, the scintillator plates 11 are part of the scintillator block 10 and allow for detecting radiation, thus causing no degradation in sensitivity even when being incorporated into the PET device 100 as shown in FIG. 7. Light may be emitted in the scintillator plates 11 in a direction in which the light travels a long distance until the light reaches a light-receiving surface, in the case of which the light is prevented from being spread while passing through the scintillator element array, thereby allowing for providing improved accuracy for emission position discrimination. That is, the scintillator block 10 of the present invention is configured such that the scintillator elements 100 and the scintillator plates 11 enhance the mutual position discrimination performances.

Figure 8:
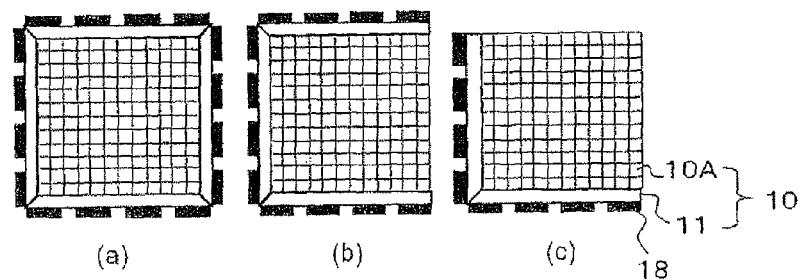
FIG. 8 shows cross-sectional views of various modified examples of the first embodiment.

As shown in FIGS. 8(a) to (c), the present invention is effective for providing improved performance even when the photodetectors 18 are coupled to a reduced number of surfaces, e.g., three surfaces as shown in FIG. 8(b) or two surfaces as shown in FIG. 8(c).

Figure 9:
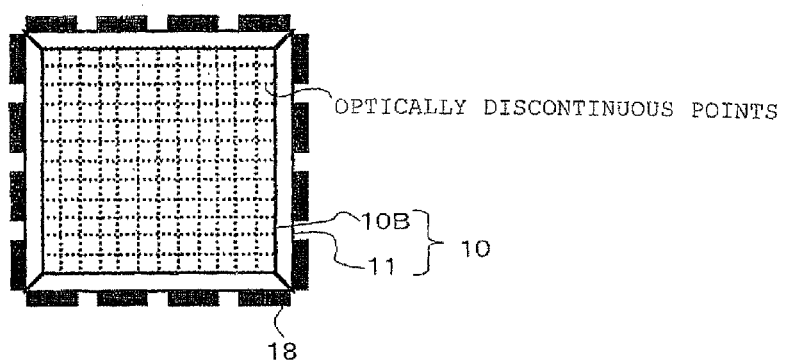
FIG. 9 is a cross-sectional view illustrating the structure of a second embodiment of the present invention.

The scintillator element array inside the scintillator block 10 may be adapted not only as in the first embodiment of an array of individual elements 100 but also as in a second embodiment shown in FIG. 9, where wall surfaces of optically discontinuous points such as micro cracks are formed by laser processing inside a large block of scintillator 10B (see Patent Literature 2), which also provides the same effects.

Figure 10:
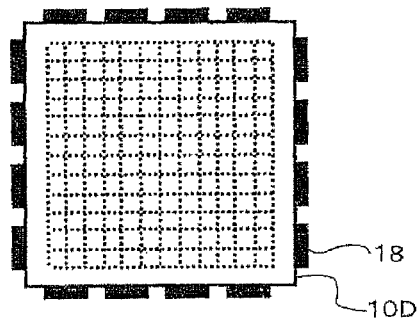
FIG. 10 is a cross-sectional view illustrating the structure of a third embodiment of the present invention.

Furthermore, as in a third embodiment shown in FIG. 10, a central portion and an outer portion are individually formed, where the central portion has the optically discontinuous points as those of the scintillator 10B inside a large block of scintillator 10D, while the outer portion is formed in the same manner as the scintillator plates 11.

Figure 11:
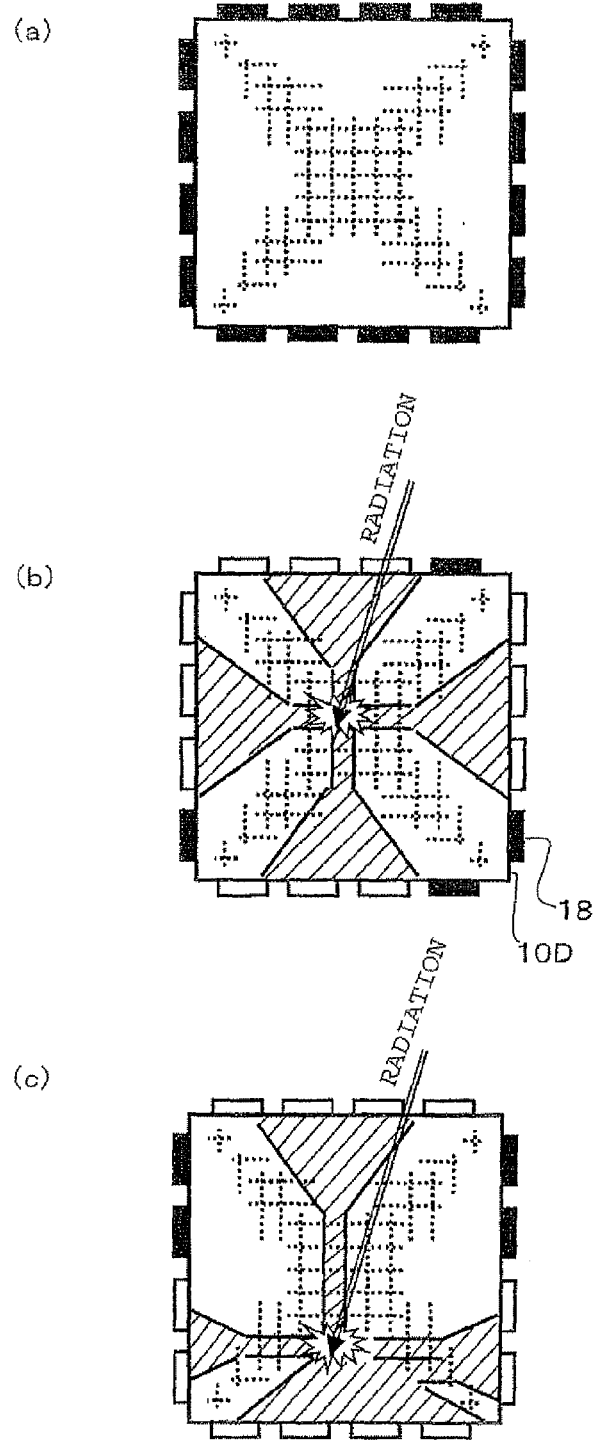
FIG. 11 shows cross-sectional views illustrating the structure and the calculation of a fourth embodiment of the present invention.

The third embodiment may be further improved into a fourth embodiment as shown in FIG. 11(a) so that the discontinuous points may be non-uniformly disposed in the central portion. FIGS. 11(b) and (c) show, as an example, how light behaves when radiation is incident on the fourth embodiment.

Figure 12:
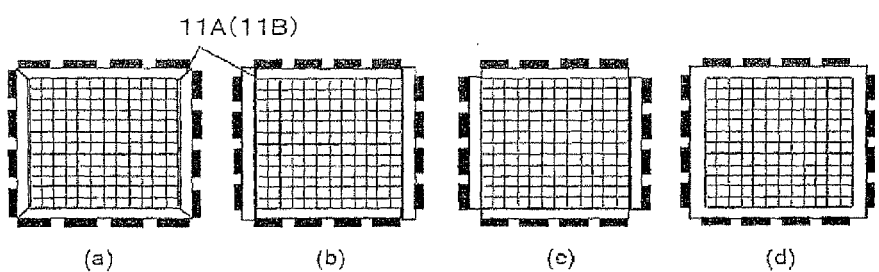
FIG. 12 shows cross-sectional views of various exemplary structures of a scintillator plate.

As shown by way of example in FIG. 12, the cross-sectional shape of the scintillator plates 11 is not limited: the plates can take a trapezoidal shape having an inclined plane of 45° as shown in FIG. 12(a), a rectangular shape as shown in FIGS. 12(b) to (d), or any other shapes. Furthermore, there is no limitation on a contact surface 11A between the plates: optical grease may be employed as a reflective material 113 as shown in FIGS. 12(a) and (b), or the plates can be separated so as not to contact with each other as shown in FIG. 12(c).

Figure 13:
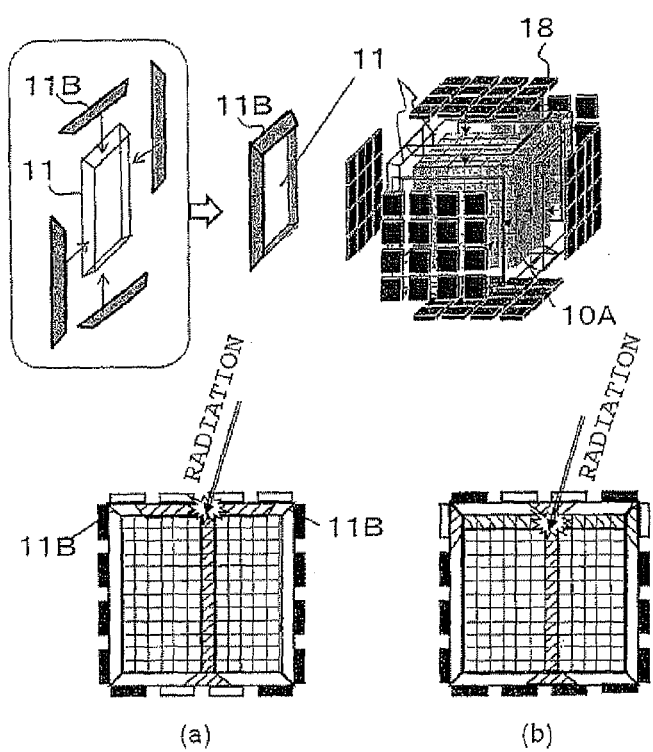
FIG. 13 shows views illustrating how to distinguish between the central portion and the outer plate portion of a scintillator block according to the first embodiment.

In the first and second embodiments, the central portion and the outer portion of the scintillator block can be discriminated by waveform discrimination using different types of scintillator. On the other hand, in the third and fourth embodiments and even when the same scintillator is employed in the first and second embodiments, the discrimination can be made by different photodetectors outputting signals as shown in FIGS. 13(a) and (b), for example, in the structure with the reflective material 11B inserted in between the contact surfaces 11A of the plate 11 in FIGS. 12(a) and (b) or in the structure with the contact surfaces separated from each other in FIG. 12(c).

Figure 14:
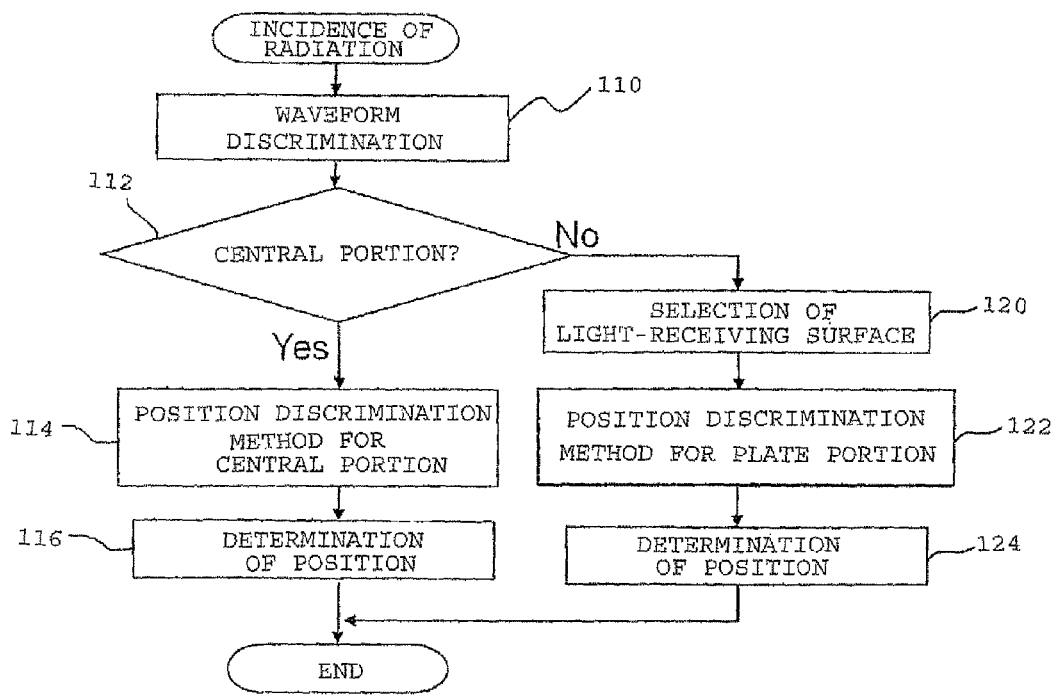
FIG. 14 is a flowchart showing the outline of a method for identifying a radiation detection position according to the present invention when different scintillators are employed for the central portion and the outer plate portion of the scintillator block.

FIG. 14 shows the outline of a method for identifying a detected position when the central portion and the outer plate portion are discriminated by waveform discrimination. If the plate portion is judged in step 112 after the waveform discrimination in step 110, then the light-receiving surface is selected in step 120 and then a position calculation for the plate portion is performed in step 122, and the radiation detected position is determined in step 124. On the other hand, if the central portion is judged in step 112, then a position calculation for the central portion is performed in step 114, thereby determining the radiation detected position in step 116.

Figure 15:
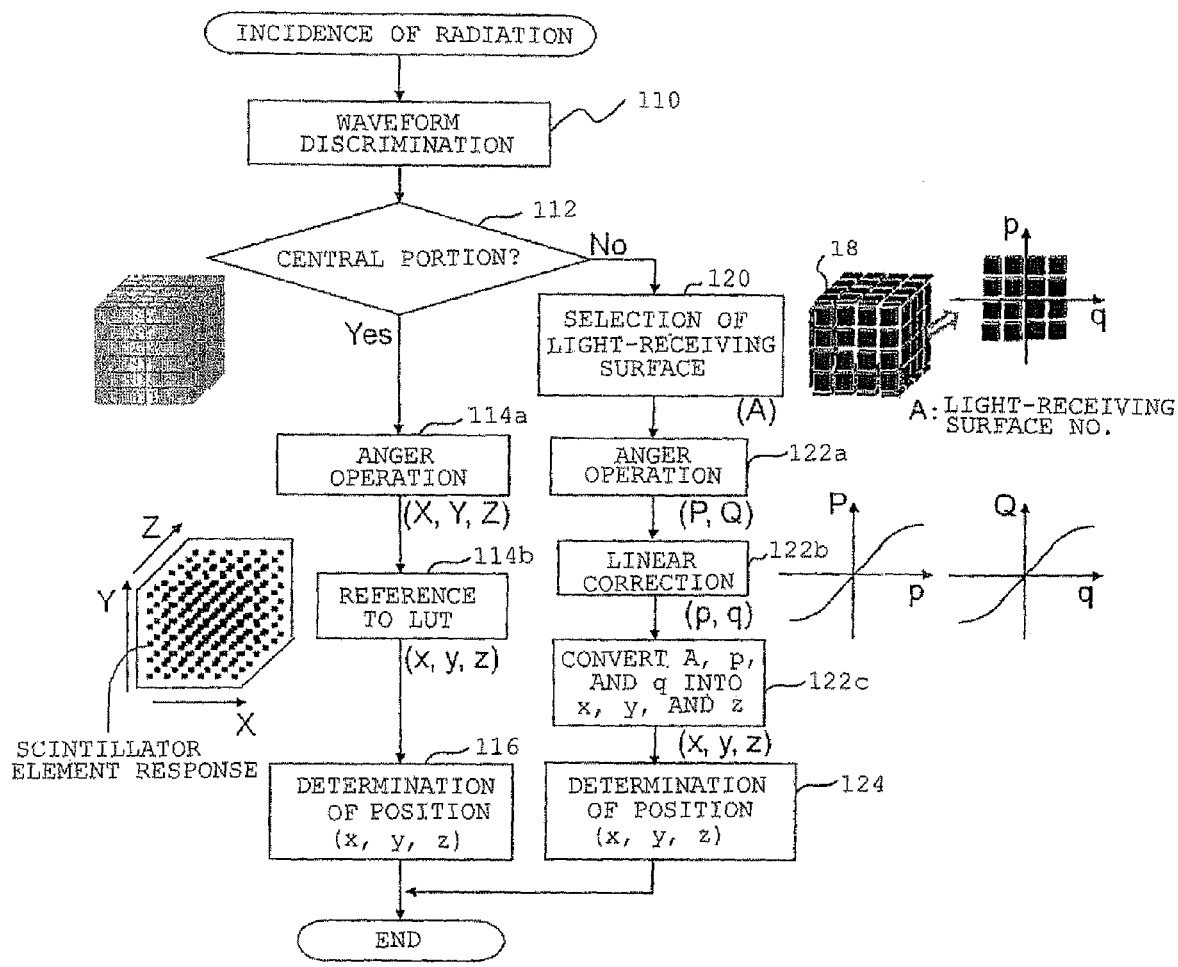
FIG. 15 is a flowchart showing a specific example for the method above.

As shown in the specific example of FIG. 15, the position calculation for the central portion may conceivably follow the Anger-type calculation of the photodetector signal (step 114a) and the reference to the look-up table (LUT) (step 114b) or the maximum likelihood estimation method. The position calculation for the plate portion may conceivably follow the Anger-type calculation of the photodetector signal (step 122a) in consideration of a correction (linear correction) for deterioration in the end position resolution of a series of scintillators (steps 122b and 122c), or the maximum likelihood estimation method.

Figure 16:
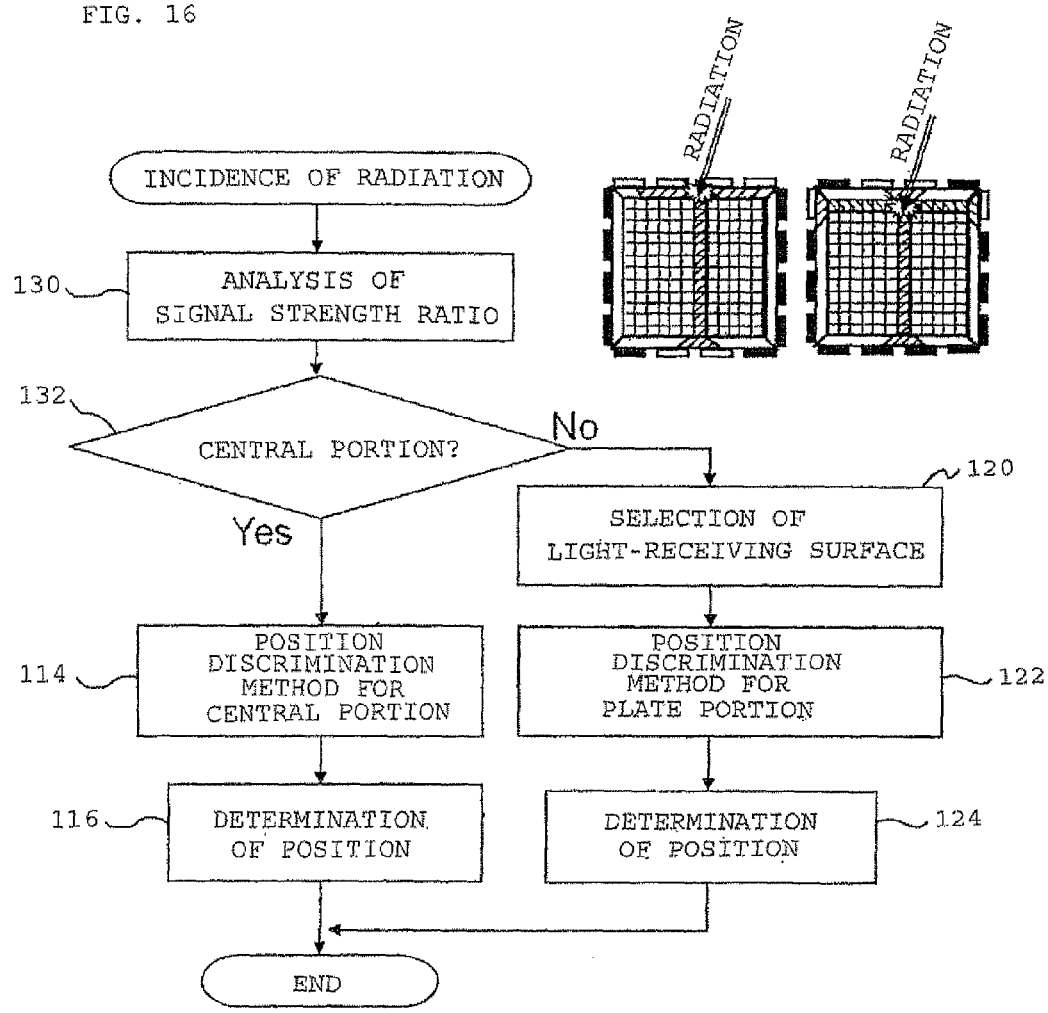
FIG. 16 is a flowchart showing an example of a method for identifying a radiation detection position, the method being adapted to differentiate between the central portion and the outer portion of the scintillator according to the present invention by analyzing the strength of photodetector signals.

FIG. 16 shows the outline of a method for identifying a radiation detected position when the detected portion is determined on the basis of the photodetector that has provided an output. In step 130, the strength ratio of photodetector signals is analyzed to discriminate between the central portion and the outer portion in step 132, and then the radiation detected position can be identified by the same method as in FIG. 14.

Figure 17:
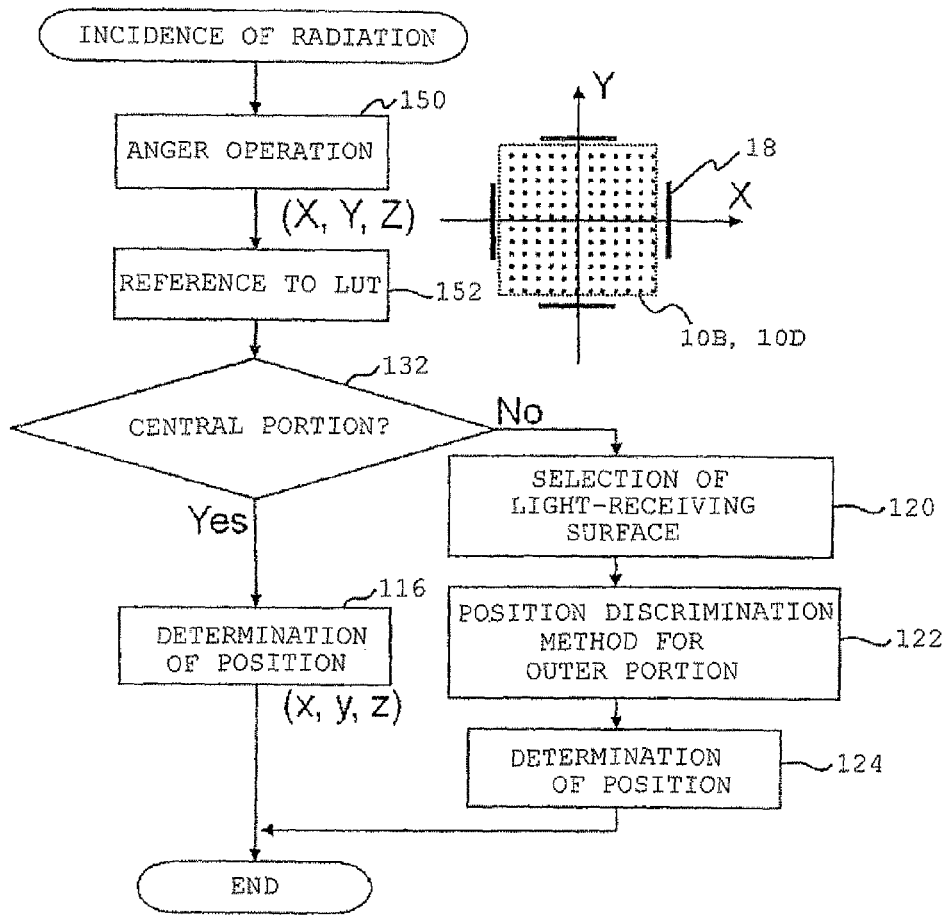
FIG. 17 is a flowchart showing another example for the method above.

Alternatively, as shown in FIG. 17, a light emission position can be first determined by the Anger-type calculation and referring to the LUT in steps 150 and 152 in the same manner as in steps 114a and 114b of FIG. 15. For the outer portion, the light-receiving surface is selected and then the position calculation for the outer portion can performed in the same manner as for the plate portion of FIG. 14.

INDUSTRIAL APPLICABILITY

The radiation detector according to the present invention and the position detection method therefor are applicable to radiation detectors such as the PET detector, the SPECT detector, and the gamma camera.

REFERENCE SIGNS LIST

10 . . . scintillator block
10A . . . three-dimensional array
10B, 10D . . . scintillator
10C . . . scintillator element
11 . . . scintillator plate
11A . . . contact portion
11B . . . reflective material
18 . . . photodetector

The invention claimed is:

1. A three-dimensional position-sensitive radiation detector, comprising:
    a scintillator block having a central portion and an outer portion, the central portion restricting a direction of diffusion of light so as to guide the light in three axial directions and having an optically discontinuous region, the outer portion being disposed outside the central portion and not restricting the direction of diffusion of light; and
    photodetectors disposed on at least two outer circumferential surfaces of the scintillator block,
    wherein a position of light emission is three-dimensionally identified, and
    wherein the central portion is provided with an array of a plurality of scintillator elements, and the outer portion is made up of scintillator plates.

2. A three-dimensional position-sensitive radiation detector, comprising:
    a scintillator block having a central portion and an outer portion, the central portion restricting a direction of diffusion of light so as to guide the light in three axial directions and having an optically discontinuous region, the outer portion being disposed outside the central portion and not restricting the direction of diffusion of light; and
    photodetectors disposed on at least two outer circumferential surfaces of the scintillator block,
    wherein a position of light emission is three-dimensionally identified, and
    wherein the central portion is provided with a block of scintillators having an optically discontinuous region formed therein, and the outer portion is made up of scintillator plates.

3. The three-dimensional position-sensitive radiation detector according to claim 1, wherein a reflective material is inserted in between contact surfaces of the scintillator plates.

4. The three-dimensional position-sensitive radiation detector according to claim 1, wherein the scintillator plates are prevented from being brought into contact with each other.

5. A method for identifying a detected position in the three-dimensional position-sensitive radiation detector according to claim 1 which employs different types of scintillators for the central portion and the outer portion, the method comprising, in identifying a detected position in the three-dimensional position-sensitive radiation detector:
    identifying, by pulse shape discrimination of photodetector signals, whether light has been received in the central portion or in the outer portion;
    performing a position calculation for the central portion when the light has been received in the central portion; and
    performing a position calculation for the outer portion when the light has been received in the outer portion.

6. A method for identifying a detected position in the three-dimensional position-sensitive radiation detector according to claim 1, the method comprising, in identifying a detected position in the three-dimensional position-sensitive radiation detector:
    identifying, on the basis of different pulse height ratios of received-light signals outputted from each photodetector, whether light has been received in the central portion or in the outer portion;
    performing a position calculation for the central portion when the light has been received in the central portion; and
    performing a position calculation for the outer portion when the light has been received in the outer portion.

7. The three-dimensional position-sensitive radiation detector according to claim 1, wherein the outer portion and the photodetectors are disposed on all the outer circumferential surfaces of the scintillator block.

8. The three-dimensional position-sensitive radiation detector according to claim 1, wherein the outer portion and the photodetectors are disposed on some of the outer circumferential surfaces of the scintillator block.

9. The three-dimensional position-sensitive radiation detector according to claim 2, wherein the outer portion and the photodetectors are disposed on all the outer circumferential surfaces of the scintillator block.

10. The three-dimensional position-sensitive radiation detector according to claim 2, wherein the outer portion and the photodetectors are disposed on some of the outer circumferential surfaces of the scintillator block.

11. The three-dimensional position-sensitive radiation detector according to claim 2, wherein a reflective material is inserted in between contact surfaces of the scintillator plates.

12. The three-dimensional position-sensitive radiation detector according to claim 2, wherein the scintillator plates are prevented from being brought into contact with each other.

13. A method for identifying a detected position in the three-dimensional position-sensitive radiation detector according to claim 2 which employs different types of scintillators for the central portion and the outer portion, the method comprising, in identifying a detected position in the three-dimensional position-sensitive radiation detector:
    identifying, by pulse shape discrimination of photodetector signals, whether light has been received in the central portion or in the outer portion;

performing a position calculation for the central portion when the light has been received in the central portion; and performing a position calculation for the outer portion when the light has been received in the outer portion.

14. A method for identifying a detected position in the three-dimensional position-sensitive radiation detector according to claim 2, the method comprising, in identifying a detected position in the three-dimensional position-sensitive radiation detector:

identifying, on the basis of different pulse height ratios of received-light signals outputted from each photodetector, whether light has been received in the central portion or in the outer portion;

performing a position calculation for the central portion when the light has been received in the central portion; and performing a position calculation for the outer portion when the light has been received in the outer portion.

* * * * *